UNITED STATES PATENT OFFICE.

CLINTON PAUL TOWNSEND, OF WASHINGTON, DISTRICT OF COLUMBIA, ASSIGNOR TO ACHESON OILDAG COMPANY, OF NIAGARA FALLS, NEW YORK, A CORPORATION OF NEW YORK.

DRY DEFLOCCULATED BODY AND METHOD OF PREPARING SAME.

1,116,957. Specification of Letters Patent. Patented Nov. 10, 1914.

No Drawing. Application filed January 18, 1910, Serial No. 538,708. Renewed March 23, 1914. Serial No. 827,781.

*To all whom it may concern:*

Be it known that I, CLINTON PAUL TOWNSEND, a citizen of the United States, residing at Washington, in the District of Columbia, have invented certain new and useful Improvements in Dry Deflocculated Bodies and Methods of Preparing Same, of which the following is a specification.

It has heretofore been shown by Acheson (see for example U. S. Patents 843,426, granted February 5, 1907, and 844,989, granted February 19, 1907) that certain solid bodies which are insoluble in water, as for example graphite, lampblack, amorphous alumina, etc., may be appropriate treatment in presence of aqueous solutions of certain organic substances capable of exerting a modifying effect, and particularly vegetable extracts, tannin, or mixtures containing the same, be reduced to such state of subdivision as to be capable of indefinite suspension in water and other liquids, passing readily in this suspended state through the finest filter paper. In this state the bodies are said to be deflocculated. Such aqueous suspensions have the property, in common with the so-called colloidal solutions, of being more or less sensitive to the action of electrolytes, as for example solutions of salts or mineral acids, being susceptible of flocculation and precipitation thereby. The precipitates so produced are not again directly suspensible in pure water; that is to say the precipitation of such suspensions is not what is commonly known as a reversible process or reaction. Similarly, a dry mass prepared by evaporation of the water at normal or higher temperatures cannot be again directly suspended in water.

I have discovered that under certain conditions it is possible to precipitate the deflocculated body, in such manner that the precipitate, either before or after complete or substantially complete dehydration and separation of the precipitating reagent, is again directly suspensible in pure water; or in other words, that under proper conditions the precipitation may be made reversible.

The following is an illustrative example of a procedure in accordance with the present invention, although it should be understood that the invention is not restricted to the treatment of graphite, or to the use of the particular reagents or proportions mentioned by way of example, or to the described manipulations.

Graphite or other suitable material is deflocculated by the action of tannin or equivalent reagent in accordance with any of the methods heretofore used, as for example those of the patents above referred to, or U. S. patent to E. G. Acheson, No. 964,478, patented July 19, 1910. The immediate product is a stiff paste which commonly contains in admixture with the deflocculated body a greater or less proportion of undeflocculated material. The paste is then stirred into sufficient water to suspend the deflocculated material, and this suspension is permitted to stand for several hours or days, or until that portion of the charge which has not undergone deflocculation has settled. The liquid carrying the suspended solid is then removed, preferably by decantation. This suspension may then be directly treated by the addition thereto of a reagent capable of precipitating the suspended body in reversible state, by which is meant in such state that the precipitate may be again suspended in water, and when so suspended will exhibit the distinctive characteristics of deflocculated bodies, remaining suspended for prolonged or indefinite periods, passing through filter paper, etc. The preferred reagents are pure or commercial acetone, ethyl alcohol, methyl alcohol, and mixtures consisting of or containing these. Other neutral liquids which are miscible with or soluble in water may produce equivalent effects. Preferably volatile liquids are used in order that they may be economically recovered. For example, the aqueous suspension containing deflocculated graphite may be mixed with an equal or somewhat greater volume of the reagent, for example commercial acetone, and permitted to stand for some hours or until the precipitate has settled. The supernatant liquid, consisting essentially of the diluted reagent, is then at once removed by decantation or filtration, and the precipitate collected upon a filter, for example an ordinary filter-press. The precipitate is preferably washed by decantation or on the filter with the concentrated or commercial reagent until the water is completely or substantially eliminated. It may then be further treated, either at atmospheric or somewhat higher temperatures, for the elimination of the volatile reagent and any residual water. This may be rapidly accomplished by slightly warming the material in a current of dry air, avoiding excessive temperatures. The resulting product, in case graphite has been treated, is a moderately hard and brittle mass which acquires luster when rubbed, appearing nevertheless to be completely deflocculated in the sense that it is directly suspensible in water without further treatment. It possesses the distinctive characteristic of being suspensible in water even without the necessity of being ground to a paste or state of fine subdivision. This characteristic is readily evidenced by placing a fragment of the material prepared as above described in the center of a drop of water on a glass surface, without stirring, when the fragment will be observed to swell and disintegrate, and to become suspended in the form of extremely minute particles. When distributed through the water by stirring it remains suspended therein for prolonged and so far as now known indefinite periods, passes through filter paper, is found to possess in the case of graphite the known lubricating properties of the deflocculated suspension, and in general exhibits the salient properties of the original deflocculated material. Dry deflocculated graphite thus prepared does not readily become directly suspended in oil, but oil suspensions thereof may be prepared from the aqueous paste, for example by the method described in U. S. Patent 911,358, granted February 2, 1909, to E. G. Acheson. The dry material appears to be quite stable in presence of air and moisture and is readily stored and transported in sealed packages without special precautions.

The original suspension, prepared for the purpose of separating any foreign or undeflocculated material, should be as concentrated as is practicable in order to reduce the quantity of precipitant required; and this quantity may be further diminished by boiling off a portion of the water, preferably *in vacuo* or under diminished pressure from the deflocculated suspension, after it has been separated from the sediment, while avoiding any drying of the mass to a non-suspensible or irreversible state.

The diluted acetone, alcohol or equivalent reagent separated from the precipitate is readily recovered by fractionating by known methods and may be used repeatedly. Inasmuch as the presence of a moderate proportion of water in the precipitating reagent is not material, the fractionations may be so conducted that the recovery of the volatile precipitant is substantially complete, aside from such losses as are incident to all commercial processes of this kind. The reagent used for washing the precipitate may be re-used one or more times without re-distillation.

The term "dry" as herein used is intended to indicate that the precipitate is apparently or physically dry, and not that no moisture whatever is retained therein, it being well understood that most solid bodies in porous or finely-subdivided form retain appreciable and often considerable proportions of moisture.

In the operation of deflocculating such bodies as graphite by the action of tannin or equivalent modifying agent, it is observed that the modifying agent disappears from solution, apparently becoming associated or fixed in or upon the particles of graphite. It is observed that little or none of this tannin is dissolved or extracted by the subsequent treatments as herein described, although both acetone and alcohol are solvents of tannin in its usual state. The modifying agent appears to remain in association with the material, presumably as a superficial coating upon the constituent particles, and to be persistently retained thereby. It is probable that the presence of this modifying agent in the dry deflocculated material is connected with its above-mentioned property of disintegration in presence of water.

The rapidity with which disintegration occurs may vary considerably according to the reagent used, the manner of preparing the original suspension and the details of the treatment. It has been observed in some cases that the material precipitated by methyl alcohol is less readily suspended than that prepared by the action of acetone or ethyl alcohol, and also that a prolonged treatment with the volatile reagent tends to yield a harder mass which is less quickly responsive to the action of water.

Lampblack and the various known forms of carbon-black, treated as above described, form excellent bases for the preparation of printing inks, india ink, etc. These may be compressed into cakes or sticks, using if desired suitable binding agents, the binder or adhesive being preferably dissolved in acetone, alcohol, glycerin or other non-aqueous solvent. Similarly, the process may be applied to other amorphous pigments, and in general to such materials as are capable of undergoing deflocculation through the action of organic modifying agents.

I claim:

1. As a new article of manufacture, a dry deflocculated body characterized by the property of disintegrating in presence of water and of remaining suspended therein.

2. As a new article of manufacture, dry deflocculated graphite characterized by the property of disintegrating in presence of water and of remaining suspended therein.

3. The method of treating aqueous suspensions of deflocculated bodies, which consists in precipitating the body in reversible state, and collecting the precipitate.

4. The method of treating aqueous suspensions of deflocculated bodies, which consists in precipitating the body in reversible state by means of a volatile liquid reagent miscible with water, and collecting the precipitate.

5. The method of treating aqueous suspensions of deflocculated bodies, which consists in precipitating the body in reversible state by means of a volatile liquid reagent miscible with water, washing the precipitate with the liquid reagent, and drying the precipitate.

6. The method of treating aqueous suspensions of deflocculated graphite, which consists in precipitating the graphite in reversible state, and collecting the precipitate.

7. The method of treating aqueous suspensions of deflocculated graphite, which consists in precipitating the graphite in reversible state by means of a volatile liquid reagent miscible with water, washing the precipitate with the liquid reagent, and drying the precipitate.

In testimony whereof, I affix my signature in presence of two witnesses.

CLINTON PAUL TOWNSEND.

Witnesses:
J. H. BRICKENSTEIN,
N. P. LEONARD.